United States Patent [19]
Bond et al.

[11] Patent Number: 5,596,709
[45] Date of Patent: Jan. 21, 1997

[54] METHOD AND APPARATUS FOR RECOVERING PARITY PROTECTED DATA

[75] Inventors: Milton F. Bond; Brian E. Clark; Raymond S. McRoberts, all of Rochester, Minn.

[73] Assignee: International Business Machines Corporation, Armonk, N.Y.

[21] Appl. No.: 122,739

[22] Filed: Nov. 12, 1992

Related U.S. Application Data

[63] Continuation of Ser. No. 542,216, Jun. 21, 1990, abandoned.

[51] Int. Cl.⁶ .................... G06F 11/10; G06F 11/20
[52] U.S. Cl. .................................................. 395/182.05
[58] Field of Search ........................... 395/575, 182.02, 395/182.03, 182.04, 182.05, 182.06, 441; 371/10.2

[56] References Cited

U.S. PATENT DOCUMENTS

| | | | |
|---|---|---|---|
| 3,893,178 | 7/1975 | Sordello | 360/73 |
| 4,092,732 | 5/1978 | Ouchi | 364/900 |
| 4,467,421 | 8/1984 | White | 364/200 |
| 4,562,576 | 12/1985 | Ratcliffe | 371/21 |
| 4,667,326 | 5/1987 | Young et al. | 371/40 |
| 4,722,085 | 1/1988 | Flora et al. | 371/38 |
| 4,754,397 | 6/1988 | Varaiya et al. | 364/200 |
| 4,761,785 | 8/1988 | Clark et al. | 371/2.2 |
| 4,768,193 | 8/1988 | Takemae | 371/10 |
| 4,775,978 | 10/1988 | Hartness | 371/38 |
| 4,817,035 | 3/1989 | Timsit | 364/900 |
| 4,849,929 | 7/1989 | Timsit | 364/900 |
| 4,870,643 | 9/1989 | Bultman et al. | 371/11.1 |
| 4,899,342 | 2/1990 | Potter et al. | 371/10.1 |
| 4,914,656 | 4/1990 | Dunphy, Jr. et al. | 371/10.2 |
| 4,942,579 | 7/1990 | Goodlander et al. | 371/51 |
| 4,989,206 | 1/1991 | Dunphy, Jr. et al. | 371/10.1 |
| 4,993,030 | 2/1991 | Krakauer et al. | 371/40.1 |
| 5,072,378 | 12/1991 | Manka | 395/575 |
| 5,088,081 | 2/1992 | Farr | 369/54 |
| 5,101,492 | 3/1992 | Schultz et al. | 395/575 |
| 5,130,992 | 7/1992 | Frey, Jr. | 371/401 |
| 5,134,619 | 7/1992 | Henson et al. | 371/40.1 |
| 5,148,432 | 9/1992 | Gordon et al. | 371/10.1 |

FOREIGN PATENT DOCUMENTS

| | | |
|---|---|---|
| 58-3113 | 1/1983 | Japan . |
| 2-90254 | 3/1990 | Japan . |

OTHER PUBLICATIONS

Lee, E., "Software and Performance Issues in the Implementation of a RAID Prototype", Report No. UCB/CSD 90/573, Computer Science Division (EECS), University of California May 1990.

(List continued on next page.)

*Primary Examiner*—Stephen M. Baker
*Attorney, Agent, or Firm*—Roy W. Truelson

[57] ABSTRACT

A storage management mechanism maintains parity records on the storage units it services, and includes a status map indicating, for each data block, the location of the corresponding parity block, and the status of the data block. If a single storage unit fails, the mechanism is placed in a failure operating mode while the system continues to operate. While in failure operating mode, storage management verifies status before accessing data on the failed storage unit. If the data has not yet been reconstructed, storage management first reconstructs the data block by successively reading and accumulating an Exclusive-OR of the corresponding blocks on all other storage units in the parity group. The reconstructed data block is then stored in the location of the parity block, and the status map is updated to indicate that the block has been reconstructed. Once the data has been reconstructed, it is only necessary to read from or write to the former parity block directly. Storage management will similarly reconstruct a block of storage on the failed unit before writing to any corresponding block on a non-failed unit, if the block has not yet been reconstructed. In an alternate embodiment, spare areas of storage in the non-failing storage units are allocated to the reconstructed data. The total of these spare areas constitute a virtual spare storage unit. As data is reconstructed, it is placed in the virtual spare unit, and parity is maintained in the normal fashion.

51 Claims, 8 Drawing Sheets

OTHER PUBLICATIONS

Invention Association Public Disclosure (Hatsumei Kyokai Kokai Giho) No. 85–14086.

Patterson et al; A Case for Redundant Arrays of Inexpensive Disks (RAID); Dept. of Elect. Engr. and Computer Sciences, Univ. of Cal. Berkeley, 1988 ACM 0–89791–268–3/88/006/0109, pp. 109–116.

Chen, P., Gibson, G., Katch, R. H., Patterson, D. A., and Schulze, M.; Introduction to Redundant Arrays of Inexpensive Disks (RAID) (Dec. 1988).

Chen, P., Gibson, G, Katz, R. H., Patterson, D. A., and Schulze, M. et al; Evolution of the Raid 2 Architecture (Jun. 12, 1990).

Maximum Strategy, Inc., San Jose, Calif; Strategy 2 Disk Array Controller Operation Manual (Nov. 2, 1988).

Maximum Strategy, Inc., San Jose, Calif.; Strategy 1 Disk Array Controller Operation Manual (Date unknown).

Gibson, G. A.; Performance and Reliability in Redundant Arrays of Inexpensive Disks (Date unknown).

Chen, P.; An Evolution of Redundant Arrays of Disks Using an Amdahl 5890; (May 1989).

Katz, R. H., Gibson, G. A., and Patterson, D. A.; Disk System Architectures for High Performance Computing (Mar. 1989).

Gray, J., Horst, B., and Walker, M.; Parity Striping of Disc Arrays: Low–Cost Reliable Storage with Acceptable Throughput (Jan. 1990).

Schultz, M. E.; Consideration in the Design of a Raid Prototype (Aug. 1988).

Clark, and Corrigan; IBM Systems Journal, vol. 23, No. 3, 1989.

Lawlor; Efficient Mass Storage Parity Recovery Mechanism; IBM Technical Disclosure Bulletin, vol. 24, No. 2, Jul. 1981, pp. 986–987 (Previously Submitted).

Anderson, M.; Strength (and Safety) in Numbers; BYTE, vol. 15, No. 13, Dec. 1990, pp. 337–339 (Previously Submitted).

Katz, R. et al; A Project on High Performance I/O Subsystems; Computer Architecture News, vol. 17, No. 5, Sep. 1989, pp. 24–31 (Previously Submitted).

Patterson et al; A Case for Redundant Arrays of Inexpensive Disks (RAID).

FIG. 1

| BLOCK ADDRESS | STATUS | PARITY BLOCK ADDRESS |
|---|---|---|
| 131 | 1 | 131 |
| 135 | 0 | 136 |
| ⋮ | ⋮ | ⋮ |
| 132 | 1 | 131 |
| 136 | 0 | 136 |
| ⋮ | ⋮ | ⋮ |
| 133 | 1 | 131 |
| 137 | 0 | 136 |
| ⋮ | ⋮ | ⋮ |

METHOD AND APPARATUS FOR RECOVERING PARITY PROTECTED DATA

This application is a continuation of Ser. No. 07/542,216, filed on Jun. 21, 1990, now abandoned.

BACKGROUND OF THE INVENTION

The present invention relates to maintaining parity information on computer data storage devices and in particular to maintaining availability of a computer system when reconstricting data from a failed storage device.

The extensive data storage needs of modern computer systems require large capacity mass data storage devices. A common storage device is the magnetic disk drive, a complex piece of machinery containing many parts which are susceptible to failure. A typical computer system will contain several such units. As users increase their need for data storage, systems are configured with larger numbers of storage units. The failure of a single storage unit cain be a very disruptive event for the system. Many systems are unable to operate until the defective unit is repaired or replaced, and the lost data restored. An increased number of storage units increases the probability that any one unit will fail, leading to system failure. At the same time, computer users are relying more and more on the consistent availability of their systems. It therefore becomes essential to find improved methods of reconstructing data contained on a failing storage unit, and sustaining system operations in the presence of a storage unit failure.

One method of addressing these problems is known as "mirroring". This method involves maintaining a duplicate set of storage devices, which contains the same data as the original. The duplicate set is available to assume the task of providing data to the system should any unit in the original set fail. Although very effective, this is a very expensive method of resolving the problem since a customer must pay for twice as many storage devices.

A less expensive alternative is the use of parity blocks. Parity blocks are records formed from the Exclusive-OR of all data records stored at a particular location on different storage units. In other words, each bit in a block of data at a particular location on a storage unit is Exclusive-ORed with every other bit at that same location in each storage unit in a group of units to produce a block of parity bits; the parity block is then stored at the same location on another storage unit. If any storage unit in the group fails, the data contained at any location on the failing unit can be regenerated by taking the Exclusive-OR of the data blocks at the same location on the remaining devices and their corresponding parity block.

U.S. Pat. No. 4,092,732 to Ouchi describes a parity block method. In the Ouchi device, a single storage unit is used to store parity information for a group of storage devices. A read and a write on the storage unit containing parity blocks occurs each time a record is changed on any of the storage units in the group covered by the parity record. Thus, the storage unit with the parity records becomes a bottleneck to storage operations. U.S. Pat. No. 4,761,785 to Clark et al., which is hereby incorporated by reference, improves upon storage of parity information by distributing parity blocks substantially equally among a set of storage units. N storage units in a set are divided into a multiple of equally sized address blocks, each containing a plurality of records. Blocks from each storage unit having the same address ranges form a stripe of blocks. Each stripe has a block on one storage device containing parity for the remaining blocks of the stripe. The parity blocks for different stripes are distributed among the different storage units in a round robin manner.

The use of parity records as described in the Ouchi and Clark patents substantially reduces the cost of protecting data when compared to mirroring. However, while Ouchi and Clark teach a data recovery or protection means, they do not provide a means to keep a system operational to a user during data reconstruction. Normal operations are interrupted while a memory controller is powered down to permit a repair or replacement of the failed storage device, followed by a reconstruction of the data. Since this prior art relies exclusively on software for data reconstruction, the system can be disabled for a considerable time.

Prior art does not teach dynamic system recovery and continued operation without the use of duplicate or standby storage units. Mirroring requires a doubling of the number of storage units. A less extreme approach is the use of one or more standby units, i.e., additional spare disk drives which can be brought on line in the event any unit in the original set fails. Although this does not entail the cost of a fully mirrored system, it still requires additional storage units which otherwise serve no useful function.

It is therefore an object of the present invention to provide an enhanced method and apparatus for recovering from data loss in a computer system having multiple data storage units, It is a further object of this invention to provide an enhanced method and apparatus whereby a computer system having multiple data storage units may continue to operate if one of the data storage units fails, Another object of this invention is to reduce the cost of protecting data in a data processing system having multiple protected storage units, A still further object of this invention is to increase the performance of a computer system having multiple data storage units when one of the data storage units fails and the system must reconstruct the data contained on the failed unit,

SUMMARY OF THE INVENTION

A storage controller services a plurality of data storage units. A storage management mechanism resident on the controller maintains parity records on the storage units it services. Data and parity blocks are organized as described in the patent to Clark et al. In the event of a storage unit failure, the system continues to operate. The storage management mechanism reconstructs data that was on the failed unit as attempts are made to access that data, and stores it in the parity block areas of the remaining storage units.

The storage management mechanism includes a status map indicating, for each data block, the location of the corresponding parity block, and the status of the data block. If a storage unit fails, the storage management mechanism is placed in a failure operating mode. While in failure operating mode, the storage management mechanism checks the status map before accessing data on the failed storage unit. If the data has not yet been reconstructed, storage management must first reconstruct the data in that block of storage by successively reading and accumulating an Exclusive-OR (XOR) of the same blocks on all storage units in the parity group, including the parity block. The block of data resulting from this Exclusive-OR is the reconstructed data, which is then stored in the location of the parity block. The status map is then updated to indicate that the block has been reconstructed. Once the data has been reconstructed, it is only necessary to read from or write to the former parity block directly. In the same manner, storage management will reconstruct the data from a block of storage on the failed unit before writing to any other block on the same stripe (on a non-failed unit). This is required because the write operation to any block on the stripe will alter parity, making it impossible to later reconstruct the block of data on the failed unit. Thus, upon failure of a storage unit, system performance is initially degraded as read and write operations cause storage management to reconstruct data. As data is rebuilt, performance quickly improves.

In the preferred embodiment, the storage units are organized and parity information is generated and stored as described in the Clark et al. patent. Reconstructed data is stored in locations where parity data is normally stored for the stripe on which the lost data resided. There is no need to power down the storage controller or any other part of the system, repair the failed storage unit, and then reconstruct the lost data. In this preferred embodiment, the data are recovered and stored while a computer system using this storage management mechanism remains completely available to a user. The storage units operate without parity protection until the failed unit is repaired or replaced. This embodiment achieves continuous operation and single-level failure protection at very little additional cost.

In a first alternate embodiment, spare areas of storage in each non-failing storage unit are allocated to the reconstructed data. The total of these spare areas constitute a virtual spare storage unit. As data is reconstructed, it is placed in the virtual spare unit, and parity is maintained in the normal fashion. This alternative achieves an additional level of failure protection, because parity data continues to be maintained after a single storage unit failure. However, it may impose a need for additional storage space for the spare areas, or cause degraded performance if these spare areas are normally used for other purposes, such as temporary data storage.

In a second alternate embodiment, the storage management mechanism resides in the host system's operating software, but otherwise performs the same functions as a storage management mechanism residing on a storage controller. This embodiment will generally be slower than the preferred embodiment, but may reduce the cost of the storage controller.

DETAILED DESCRIPTION OF THE PREFERRED EMBODIMENT

Figure 1:
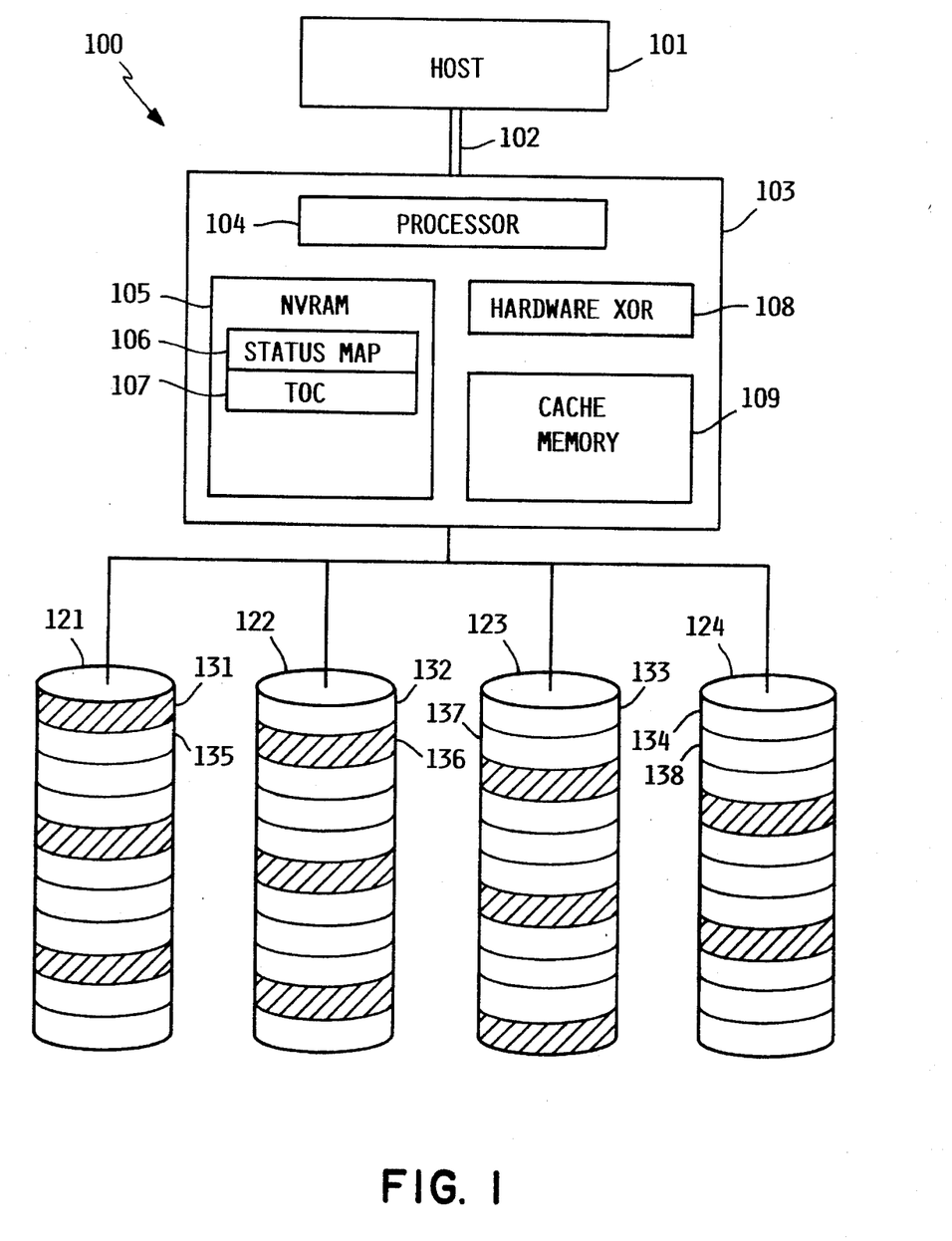
FIG. 1 is a block diagram of a system incorporating the components of the preferred embodiment of this invention.

A block diagram of the major components of computer system 100 of the preferred embodiment of the present invention is shown in FIG. 1. A host system 101, communicates over a bus 102 with a storage controller 103. Controller 103 comprises a programmed processor 104, non-volatile RAM 105, Exclusive-OR hardware 108, and cache memory (RAM) 109. Non-volatile RAM 105 contains a status map 106 and table of contents 107. Controller 103 controls the operation of storage units 121–124. In the preferred embodiment, units 121–124 are rotating magnetic disk storage units. While four storage units are shown in FIG. 1, it should be understood that the actual number of units attached to controller 103 is variable. It should also be understood that more than one controller 103 may be attached to host system 101. In the preferred embodiment, computer system 100 is an IBM AS/400 computer system, although any computer system could be used.

The storage area of each storage unit is divided into blocks 131–138. In the preferred embodiment, all storage units have identical storage capacity, and all parity protected blocks the same size. While it would be possible to employ this invention in configurations of varying sized storage units or varying sized blocks, the preferred embodiment simplifies the control mechanism.

The set of all blocks located at the same location on the several storage units constitutes a stripe. In FIG. 1, storage blocks 131–134 constitute a first stripe, and blocks 135–138 constitute a second stripe. One of the blocks in each stripe is designated the parity block. Parity blocks 131,136 are shown shaded in FIG. 1. The remaining unshaded blocks 132–135,137–138 are data storage blocks for storing data. The parity block for the first stripe, consisting of blocks 131–134, is block 131. The parity block contains the Exclusive-OR of data in the remaining blocks on the same stripe.

In the preferred embodiment, parity blocks are distributed across the different storage units in a round robin manner, as shown in FIG. 1. Because with every write operation the system must not only update the block containing the data written to, but also the parity block for the same stripe, parity blocks are usually modified more frequently than data blocks. Distributing parity blocks among different storage units will in most cases improve performance by distributing the access workload. However, such distribution is not necessary to practicing this invention, and in an alternate embodiment it would be possible to place all parity blocks on a single storage unit.

Figure 8:
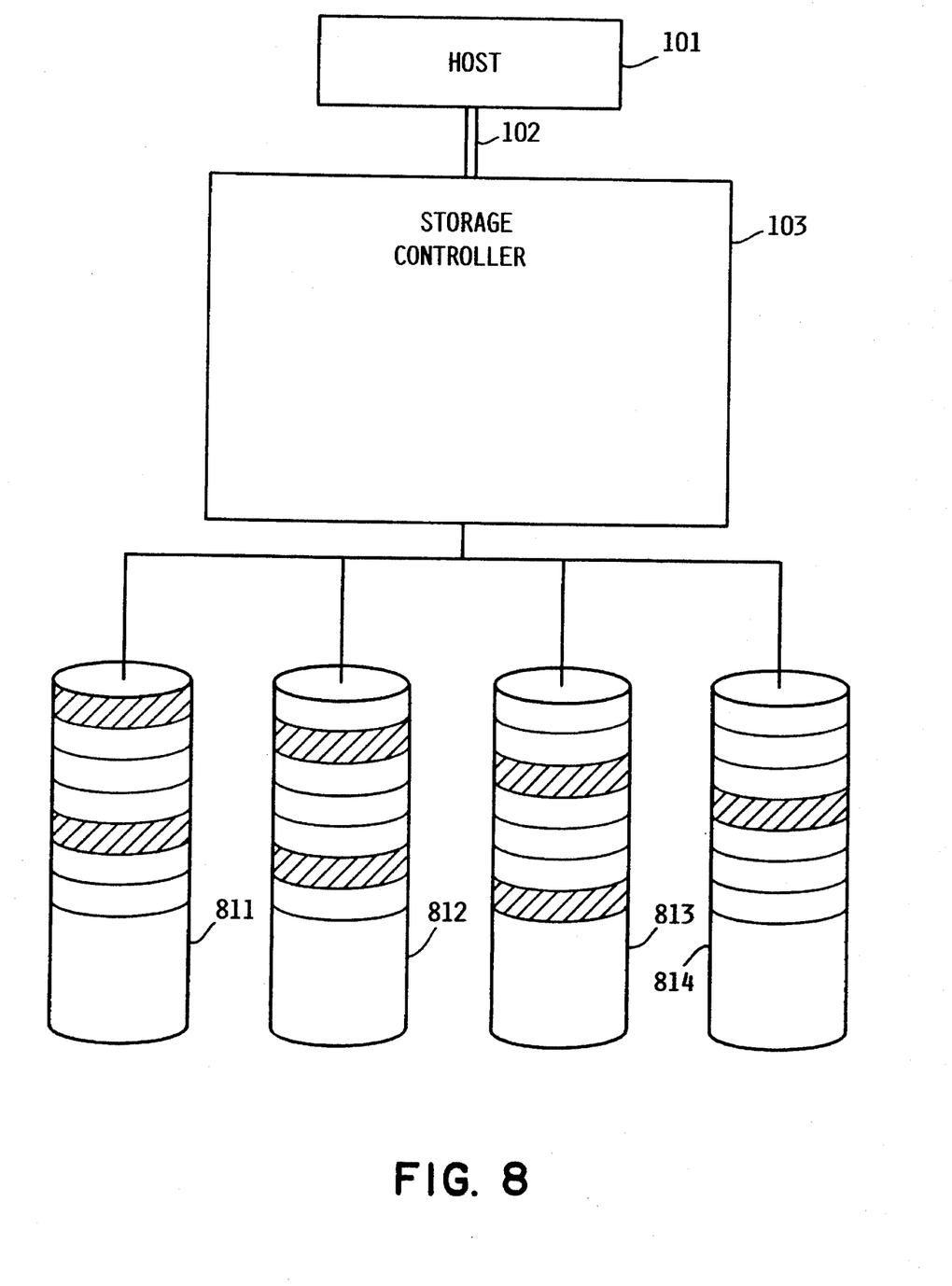
FIG. 8 is a block diagram of a system incorporating the components according to an alternative embodiment of this invention.

In the preferred embodiment, one block of every stripe is dedicated to parity information. As an alternative embodiment, one of the stripes contains no parity protection. This stripe is reserved for temporary data which does not require protection. FIG. 8 shows this alternate embodiment in the stripe consisting of blocks 811–814. Because it is extra storage space not a part of the parity data protection scheme, this block may be of any arbitrary size.

The allocation of storage area into stripes as described above, each containing blocks of data and a parity block, is the same as that described in U.S. Pat. No. 4,761,785 to Clark, et al., which is incorporated by reference.

Storage controller 103 includes programmed processor 104 executing a storage management program. The operation of the storage management program is described below. Controller 103 also includes hardware Exclusive-OR circuitry 108, for computing the Exclusive-OR of data in non-volatile RAM 105 or cache RAM 109. In an alternative embodiment, the Exclusive-OR operations could be performed by processor 104, but special hardware for this purpose will improve performance.

Non-volatile RAM 105 is used by controller 103 as a temporary queueing area for data waiting to be physically written to a storage unit. In addition to this temporary data, status map 106 and table of contents 107 are stored in non-volatile RAM 105. Table of contents 107 contains a mapping of the data waiting to be written to the location on which it is stored in the storage unit.

Figure 2:
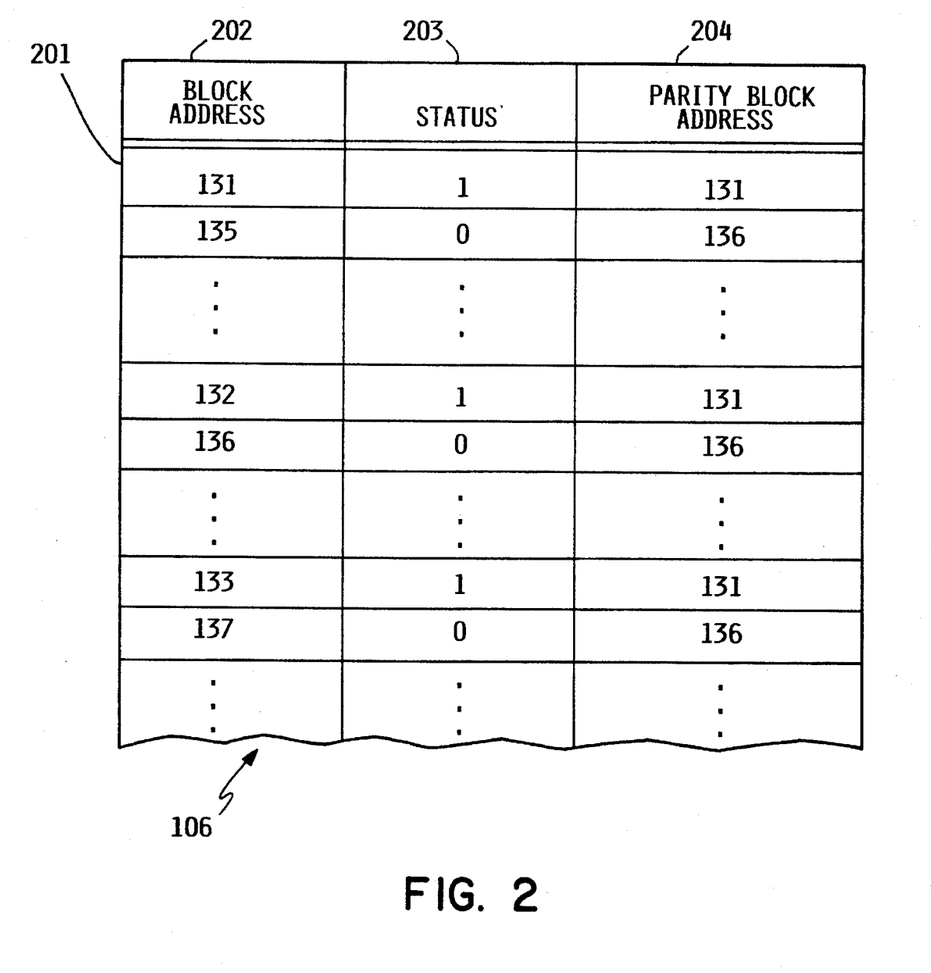
FIG. 2 is a diagram of a status map.

Status map 106 is used to identify the location of the corresponding parity block for each data block, and the status of each block of data during failure recovery mode. Status map 106 is shown in detail in FIG. 2. It contains a separate table of status map entries for each storage unit. Each status map entry 201 contains the location 202 of a block of data on the storage unit, a status bit 203 indicating whether or not the data needs to be recovered when operating in failure mode, and the location of the corresponding parity block 204.

Referring again to FIG. 1, cache memory 109 is a volatile random access memory that is used to store data read from a storage unit. It serves as a buffer when transferring data from a storage unit to host system 101 in a read operation. In addition, data is saved in cache 109 in response to indications from the host system 101 that the data has a high probability of modification and rewriting. Because unmodified data must be exclusive-ORed with modified data to update the corresponding parity data, saving read data in cache 109 can eliminate the need to read it again immediately before a write operation. Cache 109 exists only to improve performance. In an alternative embodiment, it would be possible to practice this invention without it. Cache 109 is identified as a volatile RAM because it is not necessary to the integrity of the system that data read from storage be preserved in non-volatile memory. However, the cache could be implemented as part of the non-volatile memory 105. Depending on the relative cost and size of memory modules, such an approach may be desirable.

The function of the system in conjunction with the hardware and software features necessary to this invention is described below. The system has two operating modes: normal and failure mode. The system operates in normal mode when all disk storage devices are functioning properly. When one storage device fails, the mode of operation changes to failure mode, but the system continues to operate.

Figure 3:
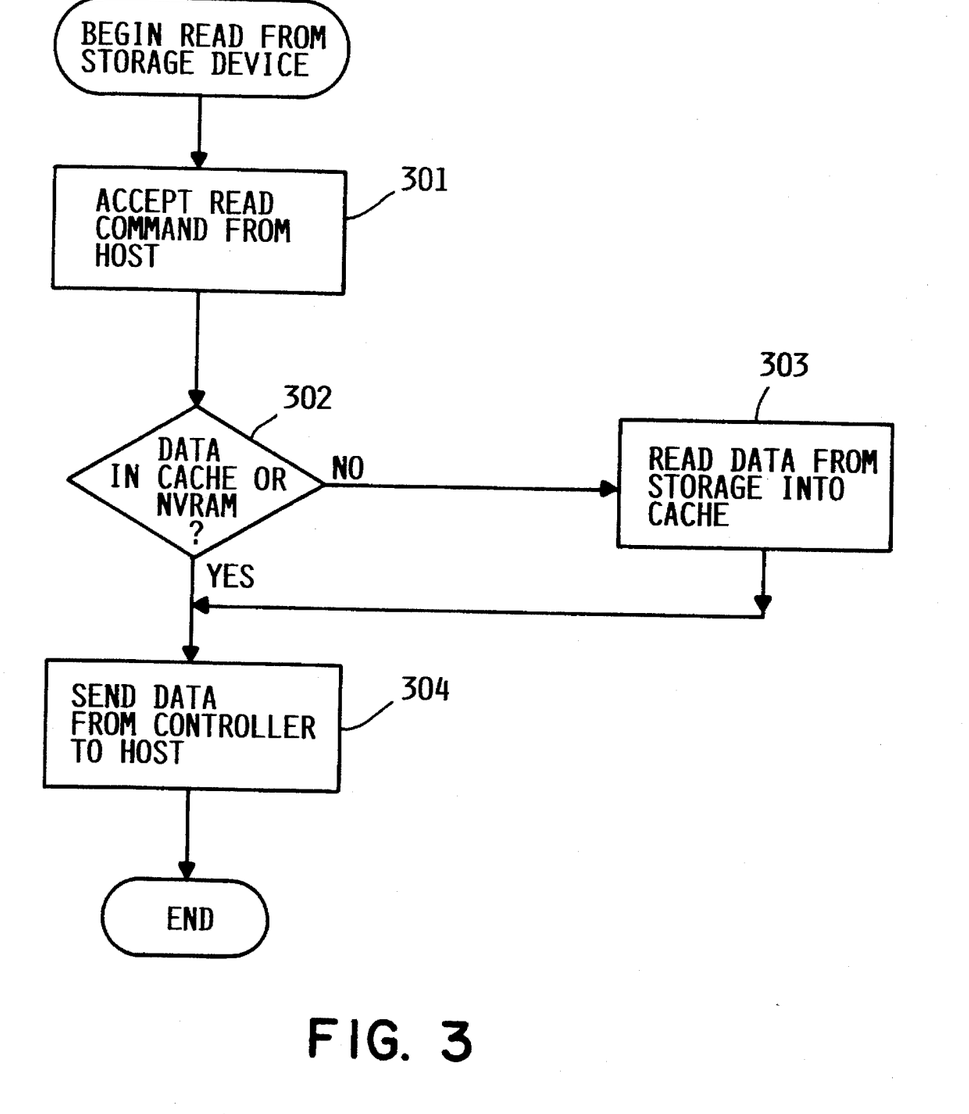
FIG. 3 is a flow diagram of the steps involved in a read operation during normal operating mode.

A READ operation in normal mode is shown in FIG. 3. The READ operation is performed by accepting a READ command from the host at step 301, and determining whether the data requested exists in non-volatile RAM 105 or cache 109 at step 302. If so, the data in non-volatile RAM or cache is sent directly to the host at step 304. Otherwise, data is first read from the appropriate storage unit into the cache 109 at step 303, and from there transferred to the host system at step 304. The cache 109 also improves performance during WRITE operations. If the original version of data to be updated is already in cache 109 when a WRITE operation is processed, it is not necessary to read the data again in order to update parity, thus improving system performance. The contents of cache 109 are managed using any of various cache management techniques known in the art.

Figure 4:
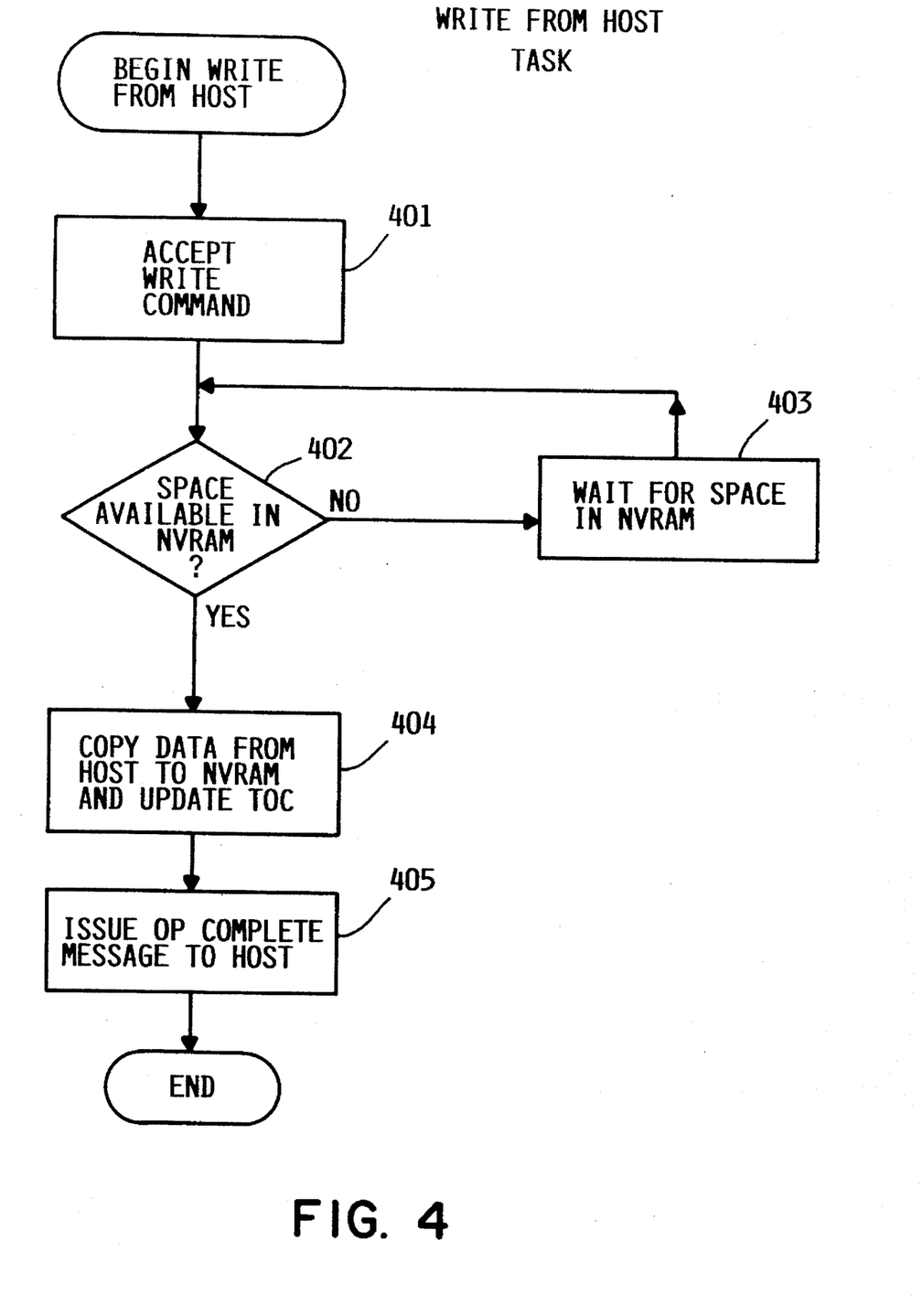
FIG. 4 is a flow diagram of the steps involved in transferring data to be written from the host to the storage controller.

A WRITE operation is performed by two asynchronous tasks running in the storage controller's processor 104. One task communicates with the host via bus 102, and is shown in FIG. 4. The WRITE operation begins when it accepts a WRITE command from the host at step 401. It then checks table of contents 107 to determine whether sufficient space is available in non-volatile RAM 105 to store the data to be written to storage in step 402 (Note that space available includes space used by back-level versions of the data to be written, as well as unused space). If space is not available, controller 103 can not receive data from the host, and must wait for space to become available at step 403 (i.e., it must wait for data already in non-volatile RAM 105 to be written to storage 121–124). When space becomes available in non-volatile RAM 105, data is copied from host 101 into non-volatile RAM 105, and table of contents 107 is updated at step 404. Processor 104 then issues an operation complete message to the host at step 405. Upon receipt of the operation complete message, the host is free to continue processing as if the data were actually written to storage 121–124, although in fact the data may wait awhile in non-volatile RAM 105. From the host's perspective, the operation will appear to be complete.

Figure 5:
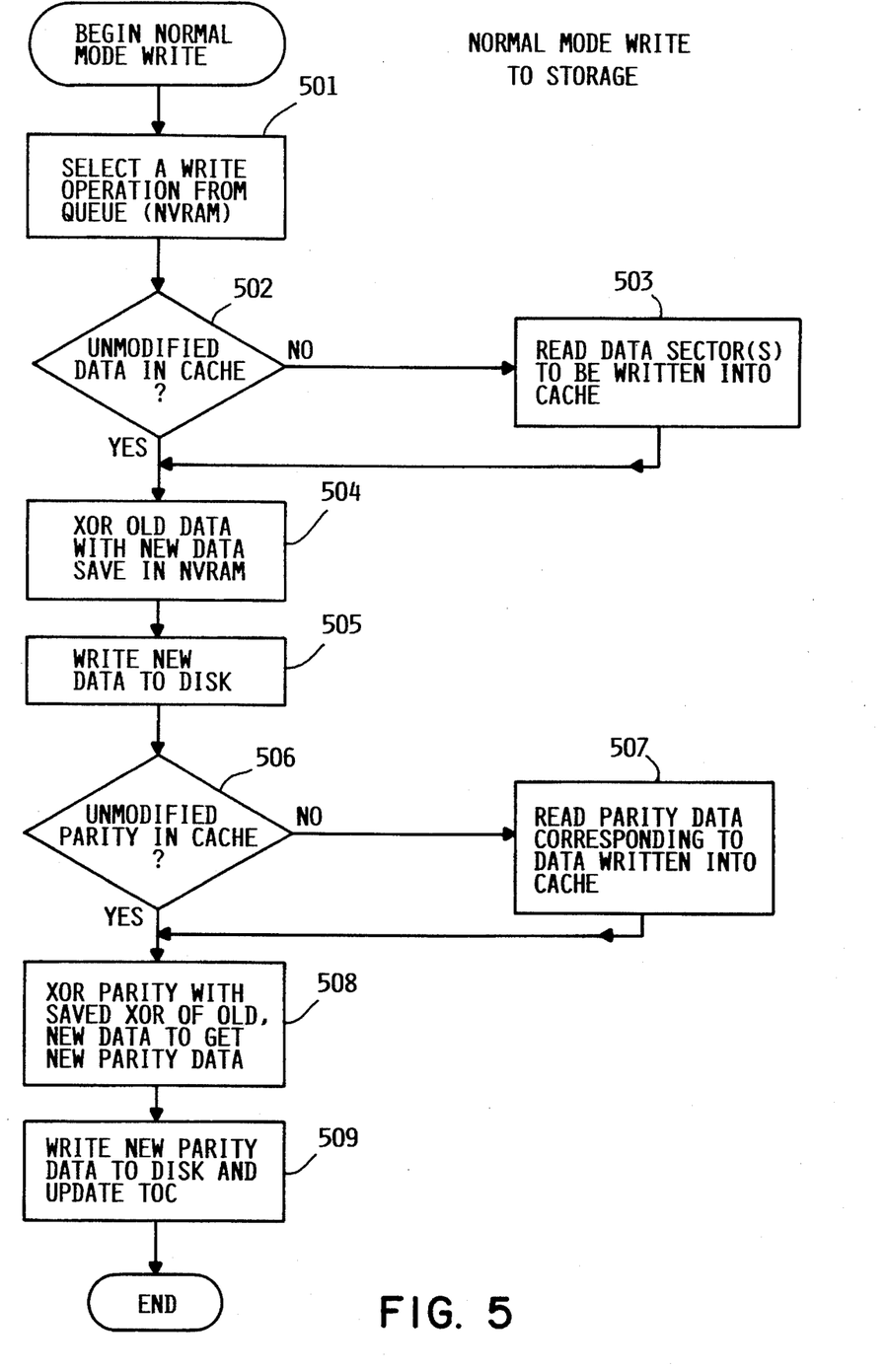
FIG. 5 is a flow diagram of the steps involved in writing data to a storage device in normal operating mode.

The second asynchronous task writes data from non-volatile RAM 105 to a storage unit. A flow diagram of this task in normal mode is shown in FIG. 5. The task selects a WRITE operation from among those queued in non-volatile RAM at step 501. The selection criteria are not a part of this invention, and could be, e.g., First-in-first-out, Last-in-first-out, or some other criteria based on system performance and other considerations. When the WRITE operation is performed, parity must be updated. By taking the Exclusive-OR of the new write data with the old data, it is possible to obtain a bit map of those bits being changed by the WRITE operation. Exclusive-ORing this bit map with the existing parity data produces the updated parity data. Therefore, before writing to storage, the task first checks whether the old data exists in the cache 109 in unmodified form at step 502. If not, it is read into the cache from storage at step 503. This old data in the cache is then Exclusive-ORed with the new data in non-volatile RAM to produce the bit map of changed data at step 504. The bit map is saved temporarily in non-volatile RAM 105 while the new data is written to one of the storage devices 121–124. The old parity data is then read into the cache (if not already there) at steps 506,507, and Exclusive-ORed with the bit map to produce the new parity data at step 508. This new parity data is written to one of the storage devices 121–124 and the table of contents is updated at step 509, completing the WRITE operation.

When a storage unit failure is detected, the system begins operating in failure mode. The failure of a storage unit means failure to function, i.e., to access data. Such a failure is not necessarily caused by a breakdown of the unit itself. For example, the unit could be powered off, or a data cable may be disconnected. From the perspective of the system, any such failure, whatever the cause, is a failure of the storage unit. Detection mechanisms which detect such failures are known in the art. Common mechanisms include a time-out after not receiving a response, and continued high error rates in received data.

Figure 6:
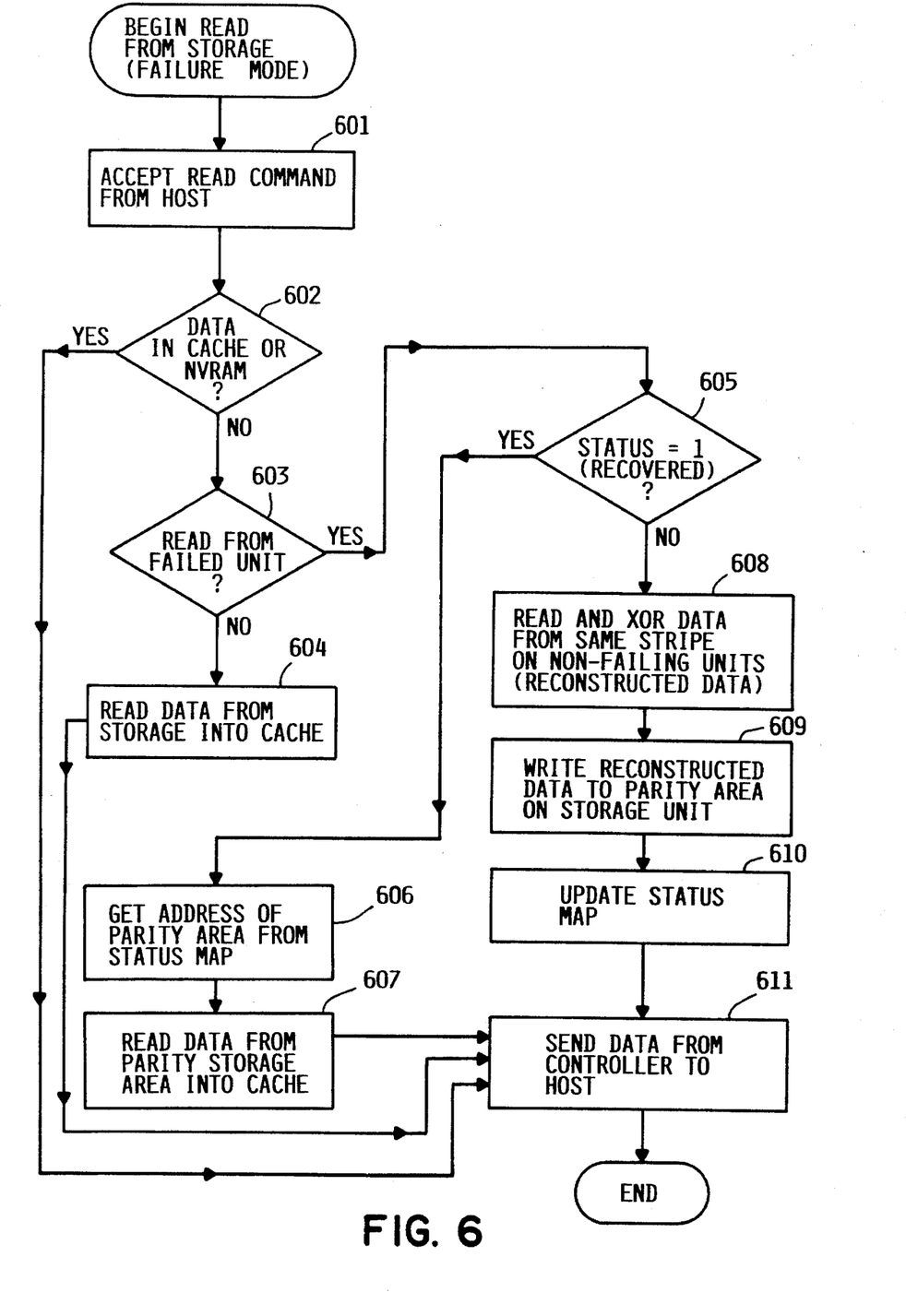
FIG. 6 is a flow diagram of steps involved in read operations following a storage device failure.

FIG. 6 illustrates the READ operation when the system is operating in failure mode. As in the case of normal mode READ operations, when a READ is accepted from the host at step 601, the controller first checks its non-volatile RAM 105 and its volatile cache 109 for the desired data at step 602. If the data exists in non-volatile RAM or cache, the data is transferred to the host via system bus 102. If the data is not in non-volatile RAM or cache, and resides on a storage device which has not failed (step 603), the data is read into the cache from the storage device in the normal manner at step 604. If the data resides on a failed storage unit, the controller checks the status map entry 201 in status map 106 for the location in storage of the desired data at step 605. The status map entry will indicate whether the data has been recovered, i.e., whether it has been reconstructed by exclusive-ORing and stored at some alternate location. If the status map indicates that the data has not been recovered (step 605) the controller successively reads the corresponding locations on all storage units except the failing one at step 608. Each block of data read is XORed by the XOR hardware 108 with the accumulated XOR results of the previously read blocks. The final XOR results constitute the reconstructed data of the failed device. This reconstructed data is written to the parity block corresponding to this block of data at step 609. The location of this block is stored in a parity block address field 204 of the status map 108. After writing the recovered data to the parity block location, status map 108 is updated at step 610 by changing the status bit 203 of each block in the same stripe to a '1' to indicate that the data has been recovered. The reconstructed data is sent to the host at step 611. If the status bit 203 originally contained a '1', indicating that data had been recovered, the controller would obtain the location of the former parity block area (where recovered data is stored) from the status map at step 606, and read the data from this location directly into the cache at step 607. By this device, it is only necessary to read all disk storage units once to recover any particular block of data. Once recovered, the physical storage location of that data is effectively relocated to the location that was formerly used for parity storage, and any subsequent reads of that block need only read the one storage unit.

Figure 7:
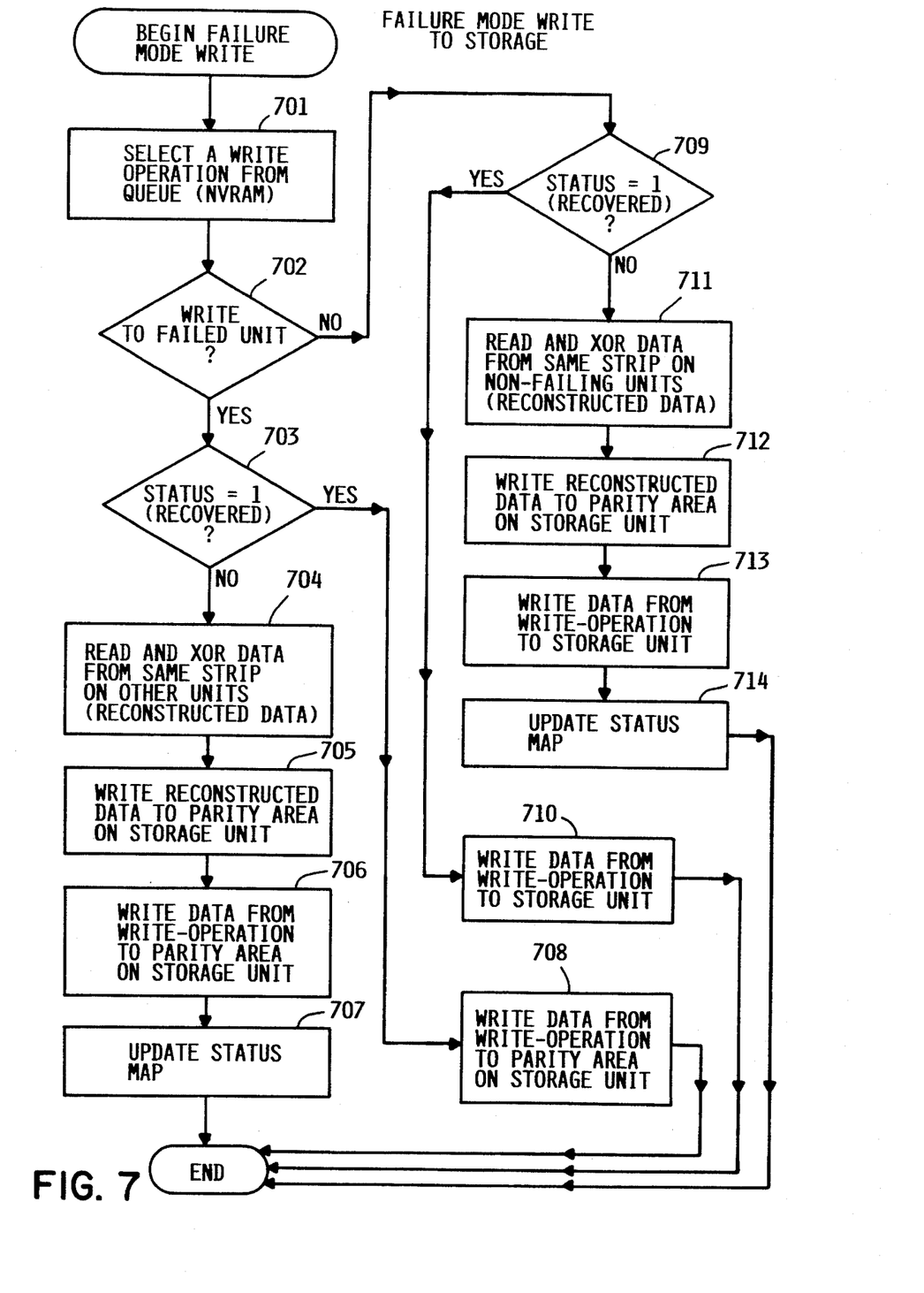
FIG. 7 is a flow diagram of the steps involved in writing data to a storage device when a storage device has failed.

FIG. 7 illustrates the write to storage operation when the system is operating in failure mode. As with the normal mode WRITE, a host communications task shown in FIG. 4 receives data to be written from the host via bus 102. The write to storage task selects a write operation from the queue in non-volatile RAM 105 at step 701. The controller determines whether the data is to be written to a failed unit (step 702) and checks the status map (steps 703, 709). If the data is to be written to a failing unit, and the data in the block has not yet been recovered, the block must be recovered before any write operations are possible. Recovery follows the same steps described above for a READ operation. Each block in the same stripe of blocks (including the parity block) is read in turn, and its contents Exclusive-ORed with the cumulative Exclusive-OR of the previously read blocks at step 704. The result, which is the reconstructed data, is written to the location used for the parity block at step 705. Once the recovery of the entire block is complete, the new data (which would typically encompass only a portion of the block) is written over the recovered data in the former parity location at step 706, and the status map updated to indicate that the block has been recovered at step 707. If data is to be written to a failing unit, but the data has already been recovered, it is written directly to the former parity location, now used for storage of recovered data, at step 708.

If data is being written to a non-failing unit when operating in failure mode, the controller checks the status map at step 709. If the status is '1', indicating that the block of data in the same stripe on the failing unit has already been recovered, the WRITE data is written directly to the non-failing storage unit at step 710. If the status is '0', data can not be directly written to the non-failing unit, because such an operation would alter parity, making it impossible to later reconstruct the corresponding data in the failed unit. Accordingly, in the preferred embodiment, the controller will first recover the block of data in the same stripe on the failing unit. As shown if FIG. 7, the block of data in the failing unit is first reconstructed by Exclusive-ORing at step 711, and saved in the parity block location at step 712, following the steps described above. The WRITE data is then written to its storage unit at step 713, and the status map is updated at step 714. Note that if the parity block for the stripe containing the data to be written is on the failing unit, no reconstruction is necessary, since parity will be lost anyway. Therefore, the status for all blocks on this stripe is set to 1 when the storage unit failure is detected. The effect will be to cause data on this stripe to be directly written to storage as if the corresponding block on the failing unit had already been recovered. For example, referring to FIG. 1, if storage unit 121 fails, the controller will immediately set the status of blocks 132–134 to '1', so that WRITE operations to these blocks can proceed directly. In an alternative embodiment, if the WRITE operation is to a non-failing unit, and the corresponding block on the failing unit has not been recovered, it would be possible to follow the same steps used for a normal mode WRITE operation to update the parity block, preserving the ability to reconstruct the failing unit's data later if a READ or WRITE of the data on the failed unit is requested.

In the preferred embodiment, parity blocks are used to store reconstructed data, with the result that the system runs without parity protection after a single storage unit failure. An alternative embodiment is possible where a sufficiently large spare storage stripe or stripes is reserved on the storage units, as shown in FIG. 8. This spare storage stripe might contain temporary data which does not require parity protection and which can be overwritten if the need arises, or it might contain no data at all. In this alternative embodiment, reconstructed data is relocated to a block of a spare storage stripe 811–814 instead of the parity block. This alternative is only possible where sufficient spare storage exists to accommodate the non-spare contents of the failed unit. It would also have the consequence of reducing the amount of temporary storage available to the system, possibly degrading performance or reducing the number of users the system can service. In this alternative embodiment, normal mode READ and WRITE operations are performed in exactly the same manner as in the preferred embodiment. When operating in failure mode, the status map is checked, and the data reconstructed as needed, in the manner described above. However, instead of writing the reconstructed data to the parity block, it is written to a block in spare storage. Another field is required in status map 106 to record the new location of the data which was contained on the failed unit. In addition, with any WRITE operation parity is updated in the same manner as a WRITE operation in normal mode. This is done after any reconstruction of data on the failed unit.

In another alternative embodiment, parity protection and mirroring are combined on the same system. Some of the data contained on the storage units is protected by the parity protection mechanism described herein, while other data is mirrored. In the event of a storage unit failure, the parity protected data is reconstructed and stored as described above, while the mirrored data is accessed from the storage unit containing the mirrored copy.

Although a specific embodiment of the invention has been disclosed along with certain alternatives, it will be recognized by those skilled in the art that additional variations in form and detail may be made within the scope of the following claims. In particular, while the disclosed preferred embodiment employs magnetic disk storage units, the invention is applicable to other storage device technologies having erasable, read/write characteristics.

What is claimed is:

1. A method of operating a computer system having a set of storage blocks, said set comprising a plurality of data storage blocks for containing data and at least one error-correction storage block for containing error correction information for the data stored in said data storage blocks, each of said storage blocks being contained on a respective data storage unit, said method comprising the steps of:

reconstructing data contained in a data storage block, while the data storage unit containing said data storage block is failing, from the remaining storage blocks in the set; and storing data reconstructed by said reconstructing step on one of said data storage units other than said data storage unit which is failing.

2. The method of operating a computer system of claim 1, wherein said reconstructing data step reconstructs data when attempts are made to access said data.

3. The method of operating a computer system of claim 1, wherein said storing data step stores the reconstructed data in said at least one error-correction storage block.

4. The method of operating a computer system of claim 3, wherein said reconstructing data step reconstructs data when attempts are made to access said data.

5. The method of operating a computer system of claim 1, wherein said data storage units contain a spare storage block, and said storing data step stores the reconstructed data in said spare storage block.

6. The method of operating a computer system of claim 5, wherein said reconstructing data step reconstructs data when attempts are made to access said data.

7. A storage apparatus for a computer system, comprising:

at least three data storage units;

at least one set of storage blocks, each set comprising a plurality of data storage blocks for containing data and at least one error-correction storage block for containing error correction information for the data stored in said data storage blocks, each of said storage blocks being contained on a respective data storage unit;

means for reconstructing the data contained in one of said data storage blocks, while the data storage unit containing said data storage block is failing, from the remaining storage blocks in the set; and means for storing said reconstructed data on one of said data storage units other than said data storage unit which is failing, wherein said data storage unit upon which said reconstructed data is stored is a data storage unit containing one of said remaining storage blocks in said set from which said means for reconstructing the data reconstructs the data.

8. The storage apparatus for a computer system of claim 7, wherein said means for storing said reconstructed data stores said data in said at least one error-correction storage block.

9. The storage apparatus for a computer system of claim 8, wherein said means for reconstructing the data comprises a storage controller, said storage controller comprising:

a programmable processor executing a storage management program; and a non-volatile random access memory.

10. The storage apparatus for a computer system of claim 8, wherein said data processing system comprises at least two of said sets of storage blocks;

wherein each said at least one error-correction storage block of a set comprises a parity storage block containing parity of the data stored in said data blocks; and wherein said parity storage blocks are distributed among said data storage units in a round robin manner.

11. The storage apparatus for a computer system of claim 8, wherein each of said data storage units is a rotating magnetic disk drive storage unit.

12. The storage apparatus for a computer system of claim 7, wherein each of said data storage units contains a spare storage block; and wherein said means for storing said reconstructed data stores said data in one of said spare storage blocks.

13. The storage apparatus for a computer system of claim 12, wherein each of said data storage units is a rotating magnetic disk drive storage unit.

14. The storage apparatus for a computer system of claim 12, wherein the total storage capacity of said spare storage blocks contained on said data storage units is sufficient to contain all data reconstructed from said failing storage unit.

15. A storage controller for a computer system, comprising:

a processor;

a memory;

means for controlling the operation of a plurality of data storage units, said data storage units containing at least one set of storage blocks, each set comprising a plurality of data storage blocks for containing data and at least one error-correction storage block for containing error correction information for the data stored in said data storage blocks, each of said storage blocks being contained on a respective data storage unit;

means for maintaining said at least one error-connection storage block;

means for reconstructing the data contained in one of said data storage blocks, while the data storage unit containing said data storage block is failing, from the remaining storage blocks in the set; and means for storing said reconstructed data on one of said data storage units other than said data storage unit which is failing, wherein said data storage unit upon which said reconstructed data is stored is a data storage unit containing one of said remaining storage blocks in said set from which said means for reconstructing the data reconstructs the data.

16. The storage controller for a computer system of claim 15, wherein said means for storing said reconstructed data stores said data in said at least one error-correction storage block.

17. The storage controller for a computer system of claim 15, wherein said plurality of data storage units contain at least two of said sets of storage blocks, wherein each said at least one error-correction storage block of a set comprises a parity storage block containing parity of the data stored in said data blocks; and wherein said parity storage blocks are distributed among said data storage units in a round robin manner.

18. The storage controller for a computer system of claim 15, wherein each of said data storage units contains a spare storage block; and wherein said means for storing said reconstructed data stores said data in one of said spare storage blocks.

19. The storage controller for a computer system of claim 18, wherein the total storage capacity of said spare storage blocks contained on said data storage units is sufficient to contain all data reconstructed from said failing storage unit.

20. A storage apparatus for a computer system, comprising:
- at least three data storage units, each said unit containing at least one storage block for storing data and a spare storage area;
- means for detecting a failure of one of said data storage units;
- means for reconstructing data stored in said data storage unit which failed;
- means for storing said reconstructed data in a plurality of said spare storage areas of said data storage units other than said data storage unit which failed.

21. The storage apparatus for a computer system of claim 20, further comprising:
- means for determining the parity of data stored in a plurality of said data storage units; and
- means for storing said parity on one of said data storage units,
- wherein said means for reconstructing data stored in a data storage unit which failed comprises means for exclusive-ORing data and parity stored on said data storage units other than said data storage unit which failed.

22. The storage apparatus for a computer system of claim 20, wherein the total storage capacity of said plurality of spare storage areas of said data storage units other than said data storage unit which failed is sufficient to contain all data reconstructed from said data storage unit which failed.

23. A storage apparatus for a computer system, comprising:
- at least three data storage units;
- parity generating means for generating parity blocks as a function of sets of data blocks, each parity block being generated as a function of a corresponding set of data blocks;
- storage management means for managing the storage of said data blocks and parity blocks on said data storage units;
- data reconstruction means for reconstructing data stored in an inaccessible storage block on one of said data storage units in the event of failure of said one data storage unit, wherein said storage management means manages the storage of said data and parity blocks such that said data reconstruction means is able to reconstruct data contained in said inaccessible storage block from the remaining storage blocks of the set of data storage blocks and corresponding parity storage block to which said inaccessible storage block belongs; and
- means for storing said reconstructed data on one of said data storage units other than said data storage unit which is failing, wherein said data storage unit upon which said reconstructed data is stored is a data storage unit containing at least one of said remaining storage blocks of the set of data storage blocks and corresponding parity storage block to which said inaccessible storage block belongs.

24. The storage apparatus for a computer system of claim 23, wherein said said storage management means comprises means for distributing each storage block of a set of data storage blocks and corresponding parity storage block on a respective one of said data storage units.

25. The storage apparatus for a computer system of claim 24, wherein each of said data storage units contains a spare storage area, and wherein said means for storing said reconstructed data stores said data in said spare storage area.

26. The storage apparatus for a computer system of claim 24, further comprising a storage controller which contains said parity generating means, said storage management means and said data reconstruction means, said storage controller having a programmable processor executing a storage management program and a random access memory.

27. A method for handling data in a system having a processor for controlling access to a plurality of data storage disks, wherein storage sectors of a selected number of said disks contain user data and storage sectors of a selected one of said disks contain redundant parity entries which match with the user data entries in the sectors corresponding thereto, corresponding user data sectors and parity sectors in said disks forming identifiable sector groups, said method being used when said plurality of disks are being operated in a degraded mode wherein one of said user data disks is inoperative and the user data therein is reconstructed from the user data in the remaining user data disks and the parity entries in the parity disk, said method including the steps wherein
- before writing new data into a selected sector of an operative disk, writing the reconstructed user data for the corresponding sector of the inoperative disk into the corresponding parity sector of the parity disk to replace the parity entry therein;
- entering at a specified identification region of said system, information identifying the inoperative disk whose reconstructed data has been written into the parity disk;
- writing the new data into the selected sector of the operative disk.

28. A method in accordance with claim 27 and further including the steps wherein
- if data cannot be read from a sector of the inoperative disk, reading the information in the specified identification region of the system to determine whether the entry in the corresponding parity sector of the parity disk is the reconstructed data of the inoperative disk; and
- reading the data in the corresponding parity sector of the parity disk if the information in said identification region identifies the entry in the corresponding parity sector as the reconstructed data for the corresponding data sector of the inoperative disk.

29. A data storage apparatus, comprising:
- a set of at least three data storage units;
- a data storage controller communicating with said data storage units, said data storage controller managing the storage of data on said set of data storage units as a plurality of sets of blocks, each set of blocks comprising a plurality of data blocks and at least one error-correction block, each block of said set of blocks being stored on a different respective one of said data storage units;
- wherein said controller, in response to detecting a failure of any one of said data storage units, reconstructs data contained on the failing data storage unit, data contained in an inaccessible block stored on the failing data storage unit being reconstructed from the remaining blocks of the set of blocks to which the inaccessible block belongs; and
- wherein said controller stores said data reconstructed from the failing data storage unit in a plurality of the remaining data storage units of said set of data storage units.

30. The data storage apparatus of claim 29, wherein at least one error-correction block contains parity information, and wherein said controller reconstructs data contained in an inaccessible block by exclusively-OR'ing all of the remaining blocks of the set to which the inaccessible block belongs.

31. The data storage apparatus of claim 29, wherein said controller stores said data reconstructed from the failing data storage unit in said error-correction blocks.

32. The data storage apparatus of claim 29, wherein said data storage controller comprises:

a programmable processor executing a storage management program; and a non-volatile random access memory.

33. The data storage apparatus of claim 29, wherein said error-correction blocks are distributed among said data storage units in a round robin manner.

34. The data storage apparatus of claim 29, wherein each of said data storage units contains at least one spare storage block, the total number of spare storage blocks contained in said data storage units being sufficient to store the contents of said failing data storage unit.

35. The data storage apparatus of claim 29, wherein said data storage controller records status information with respect to data blocks contained on the failing data storage unit, said status information including, for each respective data block, whether said data block has been reconstructed and stored in the remaining data storage units of said set of data storage units;

wherein said controller, in response to a request to access an inaccessible data block contained on the failing data storage unit, uses said status information to determine whether the inaccessible data block has already been reconstructed;

wherein said controller, in response to determining whether the inaccessible data block has already been reconstructed, reconstructs the inaccessible data block if it has not yet been reconstructed; and wherein said controller, in response to determining whether the inaccessible data block has already been reconstructed, does not reconstruct the inaccessible data block again if it has already been reconstructed.

36. A method for operating a redundant array of storage units in the event of failure of one of said storage units, said array containing a plurality of sets of blocks stored on said storage units, each said set comprising a plurality of data blocks and at least one associated error-correction block, each block of a set being stored on a different respective one of said storage units of said array, said method comprising the steps of:

reconstructing data stored in a failing storage unit of said array of storage units;

storing said reconstructed data in a plurality of blocks located on storage units of said array other than said failing storage unit, wherein no single storage unit of said array contains all said blocks in which said reconstructed data is stored.

37. The method of claim 36, wherein said storage blocks in which said reconstructed data is stored are distributed substantially evenly among all said storage units of said array other than said failing storage unit.

38. The method of claim 36, wherein said reconstructed data is stored in a plurality of said error-correction blocks.

39. The method of claim 36, wherein said reconstructed data is stored in a plurality of blocks otherwise used for storage of temporary data.

40. The method of claim 36, wherein said reconstructed data is stored in a plurality of spare storage blocks.

41. A method for operating a redundant array of storage units in the event of failure of one of said storage units, said array containing a plurality of sets of blocks stored on said storage units, each said set comprising a plurality of data blocks and at least one associated error-correction block, each block of a set being stored on a different respective one of said storage units of said array, said method comprising the steps of:

a. providing replacement storage for the failed storage unit;
   b. recording status information for data blocks of the failed storage unit, said status information including, for each respective data block, whether said data block has been reconstructed and stored in replacement storage;
   c. receiving a request to read a data block of said array;
   d. with respect to said request to read a data block:
      (1) if the requested data block is located on the failed storage unit, then:
         (a) using said status information to determine whether the requested data block has been reconstructed and stored in replacement storage;
         (b) if the requested data block has not yet been reconstructed and stored in said replacement storage, then:
            (i) accessing all of the other data blocks and at least one corresponding error-correction block in the set containing the requested data block;
            (ii) reconstructing the requested data block from the accessed blocks;
            (iii) storing the reconstructed data block in the replacement storage;
            (iv) updating said status information to reflect that said requested block has been reconstructed and stored in replacement storage;
         (c) if the requested data block has already been reconstructed and stored in replacement storage, then:
            accessing the requested data block directly from replacement storage;
      (2) if the requested data block is not located on the failed storage unit, then:
         accessing the requested data block directly.

42. The method of claim 41, wherein at least one error-correction block contains parity information, and the step of reconstructing the requested data block from the accessed blocks comprises exclusively-OR'ing all of the accessed blocks to generate a new data block.

43. The method of claim 41, wherein said replacement storage comprises a plurality of blocks distributed among different respective storage units of said redundant array of storage units.

44. The method of claim 41, further including the steps of:

e. receiving a request to write to an updated block of data of said array;
   f. with respect to said request to write to a data block to be updated;
      (1) if the data block to be updated is located on the failed storage unit, then:
         (a) using said status information to determine whether the data block to be updated has been reconstructed and stored in replacement storage;
         (b) if the data block to be updated has not yet been reconstructed and stored in said replacement storage, then:
            (i) accessing all of the other data blocks and at least one corresponding error-correction block in the set containing the data block to be updated;
            (ii) reconstructing the data block to be updated from the accessed blocks;
            (iii) storing the reconstructed data block to be updated in the replacement storage;
            (iv) updating said status information to reflect that said data block to be updated has been reconstructed and stored in replacement storage.

45. The method of claim 44, further including the steps of:
f. with respect to said request to write to a data block to be updated;
  (2) if the data block to be updated is not located on the failed storage unit, then:
    (a) using said status information to determine whether an inaccessible data block of the failed storage unit belonging to the set of blocks to which the data block to be updated belongs has been reconstructed and stored in replacement storage;
    (b) if the inaccessible data block of the failed storage unit has not yet been reconstructed and stored in said replacement storage, then:
      (i) accessing all of the other data blocks and at least one corresponding error-correction block in the set containing the inaccessible data block;
      (ii) reconstructing the inaccessible data block from the accessed blocks;
      (iii) storing the reconstructed inaccessible data block in the replacement storage;
      (iv) updating said status information to reflect that said inaccessible block has been reconstructed and stored in replacement storage.

46. A storage subsystem for storing data of a computer system, comprising:
  at least three data storage units, each data storage unit for storing a plurality of blocks, each block being contained in one of a plurality of sets, each said set comprising a plurality of data blocks and at least one associated error-correction block, each block of a set being stored on a different respective one of said plurality of data storage units;
  a controller coupled to said data storage units, said controller comprising:
  a programmed processor for executing a storage management program to control the operation of said storage subsystem;
  a memory, said memory including a status map, said status map having a plurality of status entries recording the status of said blocks of data;
  an error-correction block generator for generating an error-correction block as a function of other blocks of the corresponding set of blocks;
  wherein in the event of failure of one of said data storage units, said storage management program causes said controller to:
(a) allocate replacement storage for data stored on the failed data storage unit;
(b) upon receiving a request to read a block of data stored in said storage subsystem,
  (1) if the requested data block is located on the failed storage unit, then:
    (a) access information stored in said status map to determine whether the requested data block has been reconstructed and stored in the replacement storage;
    (b) if the requested data block has not yet been reconstructed and stored in said replacement storage, then:
      (i) read all of the other data blocks and at least one corresponding error-correction block in the set containing the requested data block,
      (ii) reconstruct the requested data block from the read blocks,
      (iii) store the reconstructed data block in the replacement storage, and
      (iv) update said status map to reflect that the requested data block has been reconstructed;
    (c) if the requested data block has already been reconstructed and stored in replacement storage, then:
      read the requested data block directly from the replacement storage;
  (2) if the requested data block is not located on the failed storage unit, then:
    read the requested data block directly.

47. The storage subsystem of claim 46, wherein said replacement storage comprises a plurality of blocks distributed among different respective data storage units of said subsystem.

48. The storage subsystem of claim 47, wherein said error correction block generator generates a parity block as an exclusive-OR function of other blocks of the corresponding set of blocks.

49. A data storage apparatus for storing data on a set of at least three data storage units, said data storage apparatus comprising:
  error-correction generation means for generating error-correction blocks as a function of sets of data blocks, each error-correction block being generated as a function of a corresponding set of data blocks;
  storage management means for managing the storage of said data blocks and error-correction blocks on said data storage units;
  data reconstruction means for reconstructing data stored in inaccessible storage blocks on a failing data storage unit and storing reconstructed data in replacement storage, wherein said storage management means manages the storage of said data and error-correction blocks such that said data reconstruction means is able to reconstruct data contained in an inaccessible storage block from the remaining storage blocks of the set of data storage blocks and corresponding error-correction storage block to which said inaccessible storage block belongs;
  status mapping means for recording the reconstruction status of inaccessible storage blocks on said failing data storage unit, said status mapping means recording, for each respective inaccessible block, whether said inaccessible block has been reconstructed;
  failure mode data accessing means for responding to a request to mad data stored on said set of at least three storage units after failure of said failing data storage unit, said failure mode data accessing means cooperating with said status mapping means and said data reconstruction means to (a) access said data directly if said data is not stored on said failing data storage unit, (b) access said data in replacement storage if said data is stored in an inaccessible block on said failing data storage unit and said status mapping means indicates that said data has already been reconstructed, and (c) reconstructing and storing said data in replacement storage with said data reconstruction means, and updating status information with said status mapping means, if said data is stored in an inaccessible block on said failing data storage unit and said status mapping means indicates that said data has not yet been reconstructed.

50. The data storage apparatus of claim 49, wherein said error-correction blocks contains parity information, and the error-correction generation means generates each error-correction block as an exclusive-OR function of said corresponding set of data blocks.

51. The data storage apparatus of claim 49, wherein said replacement storage comprises a plurality of blocks distributed among different respective storage units of said set of at least three data storage units.

* * * * *

UNITED STATES PATENT AND TRADEMARK OFFICE
CERTIFICATE OF CORRECTION

PATENT NO. : 5,596,709
DATED      : January 21, 1997
INVENTOR(S) : Milton F. Bond et al It is certified that error appears in the above-identified patent and that said Letters Patent is hereby corrected as shown below:

Column 16, line 42, "mad" should be -- read --.

Signed and Sealed this

Thirteenth Day of May, 1997

Attest:

BRUCE LEHMAN

Attesting Officer

Commissioner of Patents and Trademarks